T. I. DUFFY.
HUB FOR DEMOUNTABLE WHEELS.
APPLICATION FILED SEPT. 16, 1912.
1,123,713.
Patented Jan. 5, 1915.
3 SHEETS—SHEET 1.
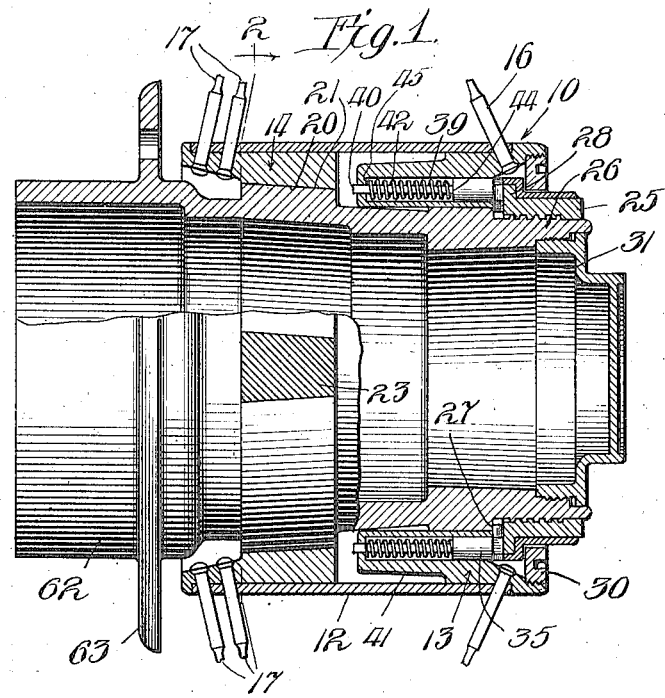
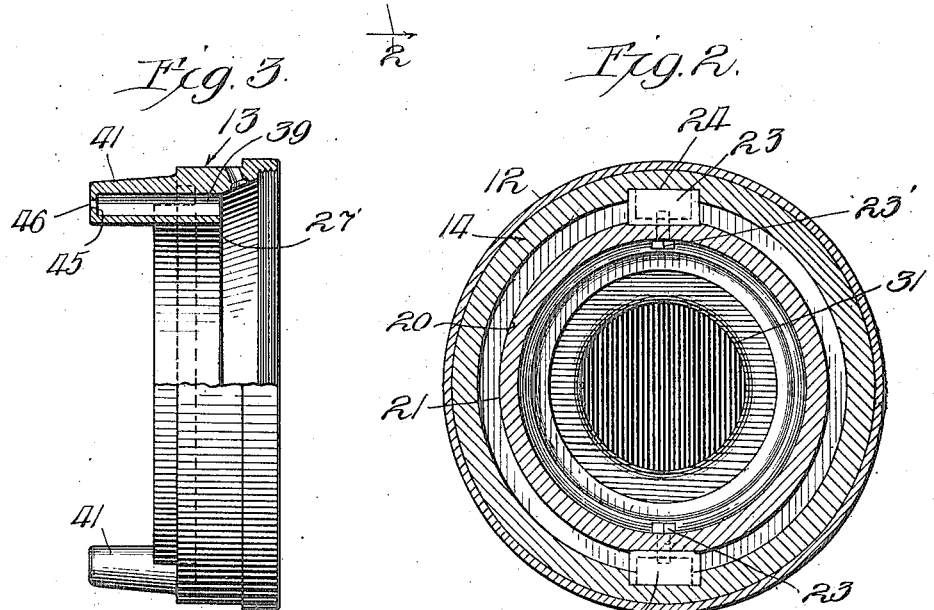
Witnesses:
Harry S. Gaither
G. E. Dowle
Inventor:
Thomas I. Duffy
by William N. Hall
Atty

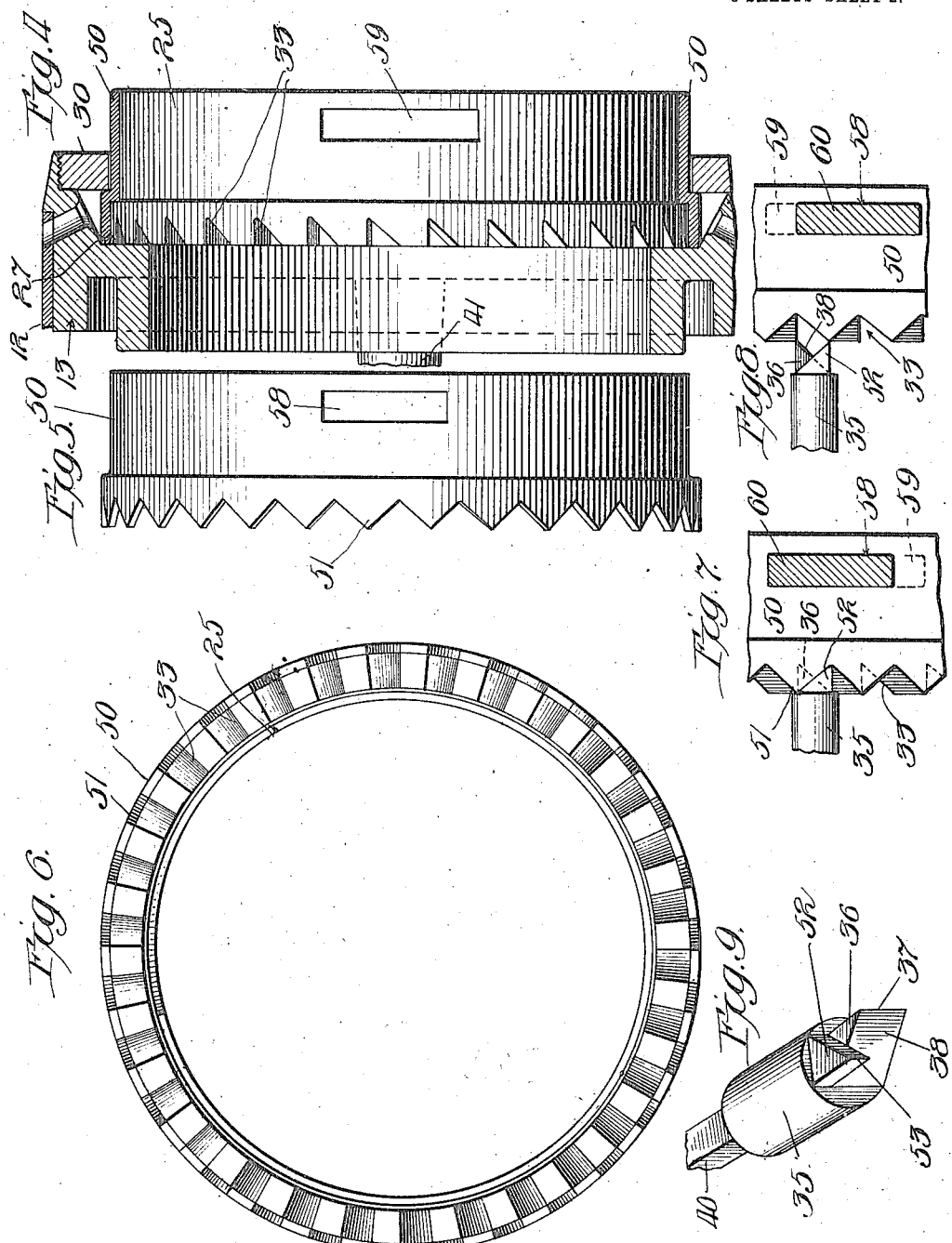

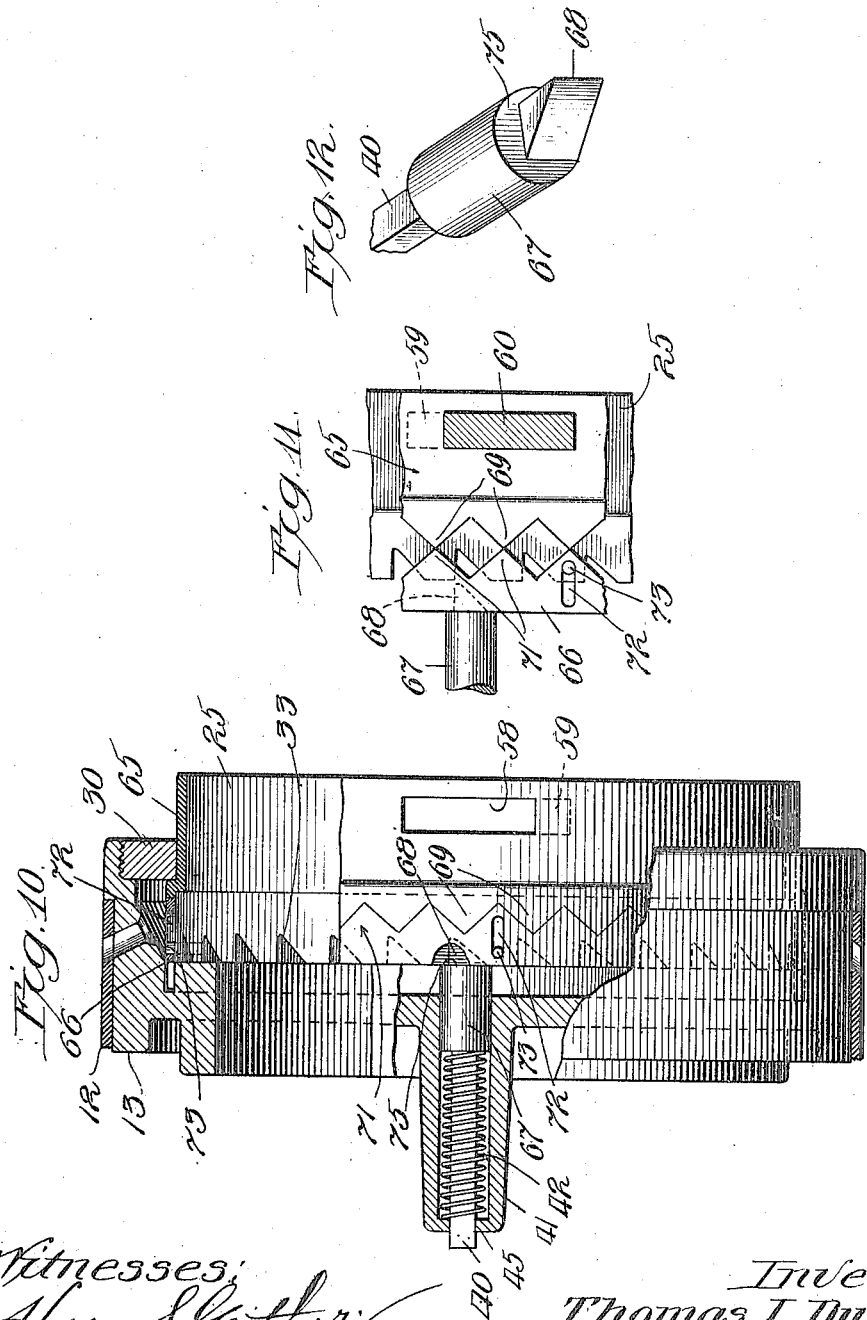

UNITED STATES PATENT OFFICE.

THOMAS I. DUFFY, OF CHICAGO, ILLINOIS, ASSIGNOR TO E. C. SALES CO., OF CHICAGO, ILLINOIS, A CORPORATION OF ILLINOIS.

HUB FOR DEMOUNTABLE WHEELS.

1,123,713.  Specification of Letters Patent.  Patented Jan. 5, 1915.

Application filed September 16, 1912. Serial No. 720,533.

*To all whom it may concern:*

Be it known that I, THOMAS I. DUFFY, a citizen of the United States, and a resident of Chicago, in the county of Cook and State of Illinois, have invented certain new and useful Improvements in Hubs for Demountable Wheels; and I do hereby declare that the following is a full, clear, and exact description thereof, reference being had to the accompanying drawings, and to the characters of reference marked thereon, which form a part of this specification.

This invention relates to improvements in hubs for demountable wheels of that class in which the hub embraces an inner member which is removably carried by the vehicle axle in the manner of an ordinary wheel hub, and an outer member which carries the spokes, fellies and tire, the arrangement being such that the outer member, carrying the principal parts of the wheel, may be removed upon the occasion of injury to a tire and another wheel having thereon a perfect tire substituted therefor.

Among the objects of the invention is to provide improved means for interlocking the hub members from rotation while permitting the outer member to be readily removed from and applied to the inner hub member.

A further object of the invention is to provide an improved locking means for locking the hub members together, with means for releasing the locking means when the hub members are to be disassembled.

Other objects of the invention are to improve and simplify the hub construction as a whole, and the invention consists in the matters hereinafter set forth and more particularly pointed out in the appended claims.

In the drawings:—Figure 1 is a view partially in axial section and partially in elevation of a hub embodying my invention. Fig. 2 is a transverse section on the line 2—2 of Fig. 1. Fig. 3 is a partial side elevation and partial section of one of the members of the outer hub member. Fig. 4 is a detail sectional view showing the locking ring in elevation, the lock release ring in section, and a portion of the associated outer hub member. Fig. 5 is a plan view of the lock release ring. Fig. 6 is an inner end view of the locking and lock release ring assembled. Fig. 7 is a detail of the locking and lock release rings showing the locking latch in position to lock the locking ring in place. Fig. 8 is a similar detail showing the lock release ring in position to release the latch from the locking ring. Fig. 9 is a perspective view of the locking dog or latch. Fig. 10 is a view similar to Fig. 4, showing a modification. Fig. 11 is a detail showing the release position of the lock release means of the modification. Fig. 12 is a perspective view of the locking latch employed with the construction shown in Figs. 10 and 11.

The hub comprises, as herein shown, an outer member designated as a whole by 10 and an inner member designated as a whole by 11. The inner hub member is interiorly shaped to receive bearings for the axle which carries the hub and may be adapted to standard or special bearings, as desired. The outer hub member is shown as made up of a tubular shell 12 and front and rear ring members 13, 14, respectively, that are fitted tightly in the ends of the shell and provided with exterior annular shoulders that are driven up tight against the end margins of the shell. The hub, as herein shown, is adapted to a wire wheel construction, such for instance as is shown in my pending application for U. S. Letters Patent, filed on the 28th day of August, 1912, Serial No. 717,429. In the construction shown, holes are drilled through the shell and ring members of the outer hub member to receive the wire spokes 16, 17 whereby said spokes are rigidly attached to the hub, and also constitute means to hold the ring members and shell in assembled relation. The said outer and inner hub members are provided with complemental tapered portions which are forced together and locked with a wedging fit. As herein shown, this tapered connection is formed between the inner member and the rear ring member 14 of the hub, said rear ring member having an internal rearwardly flaring tapered portion 20 to engage the tapered portion 21 of the inner hub member 11. The said hub members thus fitted together are herein shown as provided in their tapered portions with interlocking lugs and notches to prevent relative rotation of the hub members. As herein shown, the inner hub member 11 is provided in its tapered portion with one or more recesses to receive one or more locking keys or lugs 23, disposed longitudinally of the hub, and the outer member is provided with opposing notches or recesses 24 to receive said locking lugs. As herein shown, two diametrically opposed locking lugs or keys 23 are employed. When carried by the inner hub member, they may be attached thereto by the screws 23' shown in Fig. 2. The lateral sides of said lugs 23 and the side walls of the notches 24 are tapered on the same angle as the interfitting tapers 20 and 21 of the inner and outer members, whereby lost motion between the lugs and the walls of the notches may be taken up on the lugs by forcing the tapered portions tightly over each other. The front end of the inner hub member has close guiding engagement in and is supported on the front ring member 13 of the outer hub member, as clearly shown in Fig. 1.

The hub members are forced together and locked in assembled position by means of a locking ring 25 that is screw-threaded over the externally screw-threaded portion 26 at the front end of the inner hub member and bears against a shoulder 27 formed within the front ring member 13 of the outer hub member. The said locking ring is provided at its rear end with an annular flange 28 which lies behind a shoulder on the outer hub member, herein shown as formed by the ring 30 that is screw-threaded into the front end of the front ring member 13, thus providing means for withdrawing the outer hub member away from the inner hub member when the locking ring is screwed off the inner hub member. The ring may be provided with the usual spanner holes or notches to facilitate engagement therewith of a wrench to apply and remove the ring. The inner hub member is closed by the usual hub cap 31, as shown in Fig. 1.

Referring now to the means for locking the locking ring 25 in place, and to the means for releasing the locking means to permit the locking ring to be turned off the inner hub member and thereby remove the outer hub member, the same is herein shown as made as follows: The locking ring 25 is provided on its rear end with a series of ratchet notches 33, one side of each notch being abrupt and the other side being oblique or tapered as best shown in Fig. 4. The said notched end of the ring has a wide face, as shown in Fig. 6, to furnish ample bearing against the outer hub member. 35 designates an endwise reciprocable latch that is provided at its forward end with a tooth 36 made of the same shape as the notches 33 and adapted to enter the same in the manner clearly shown in Figs. 1 and 7. I have herein shown and preferably will employ two of said latches, but in the following description reference will be made to a single latch and its mounting, both being alike. The abrupt face 37 of the tooth 36 opposes the abrupt walls of the notches 33 and prevents rotation of the locking ring in a direction to screw the ring off the inner hub member, when the latch is in its normal locking position, as shown in Fig. 7. The oblique face 38 of the tooth 36 opposes the oblique or inclined walls of the notches 33, so that when the locking ring is turned in a direction to screw it onto the inner hub member said opposing oblique surfaces serve to force the latch away from the notched end of the locking ring to permit it to pass said latch. The said latch is slidably mounted in a suitable opening 39 in the front ring member 13 of the hub and is provided with a rearwardly extending shank 40 that occupies a hollow rearward extension or lug 41 of the ring member 13. The said extension or lug 41 is provided to receive an actuating spring 42, herein shown as having the form of a spiral spring that surrounds said shank and is interposed between a shoulder 44 on the latch and an opposing shoulder 45 within the hollow lug. The said shank 40 is preferably made non-circular, and extends through a non-circular opening 46 in the rear wall of the hollow lug 41 to prevent the latch from turning on its axis. The said spring 42 normally holds the latch engaged with the ratchet notches 33, but permits the latch to be forced backwardly when the ring is turned on the inner hub member. Surrounding said locking ring and rotatively mounted thereon is a lock release ring 50 which is made of the same cross section as the locking ring, but thinner. The said lock release ring 50 is provided on its inner margin with a series of cam projections 51 that engage a tooth or projection 52 on the locking latch 35 radially exterior to the tooth 36. The said tooth 52 is of the same general shape as the tooth 36, as herein shown, with the oblique face 53 thereof opposing the oblique face 38 of the tooth 36, and with the points of said teeth spaced a distance apart. The engagement of the cam projections with the tooth 52 is such that when the said lock release ring is turned, relatively to the locking ring, in the direction in which the locking ring is screwed off the inner hub member, the said latch is forced rearwardly, against the action of its spring 42, with the locking tooth 36 released from the ratchet notches of the locking ring, and is held in this position so that the locking ring may be turned off the inner hub member. As herein shown, the cam projections 51 of the lock release ring 50 are V-shaped and in their normal positions, as shown in Fig. 7, assumed when the latch is engaged with the locking ring, the points of the V-shaped cam projections lie substantially in line with the abrupt faces of the ratchet notches of the locking ring, so as not to interfere with the free projection of the latch tooth 36 into the ratchet notches 33. When the lock release ring is turned in the direction in which the locking ring is turned off the inner hub member the points of the cam projections 51 are shifted or displaced to bring the same substantially in line with the outer ends of the oblique walls of the ratchet notches. In such angular displacement of the cam projection 51 the inclined or oblique faces of said cam projections act against the oblique face 53 of the latch tooth 52, so as to force the latch backwardly to the position shown in Fig. 8. The points of the teeth 52 and 36 are spaced at such distance apart as to bridge the spaces between the teeth or projections formed between the ratchet notches 33, as shown in Fig. 8, and as long as the lock release ring remains in this position, relatively to the locking ring, the locking latch cannot enter the ratchet notches of the locking ring. The locking ring is thus free to be unscrewed to remove the outer hub member. This short movement of the lock release ring relatively to the locking ring to effect the angular displacement of the cam projections, relatively to the ratchet notches to release the tooth 36 of the latch from said notches, may be accomplished by providing said rings with spanner openings 58, 59, respectively, as shown in Figs. 4 and 5, adapted when the parts are assembled to lie one over the other, and with the opening 58 of the lock release ring shorter than the opening 59 of the locking ring. The said rings are adapted to be manipulated by a spanner wrench having lugs 60 which are made to closely fit the openings 58 of the lock release ring, so that when the spanner wrench is engaged with said rings the first movement thereof to turn the rings will give preliminary movement to the lock release ring to release the locking latch, and the subsequent movement will turn both rings to a like extent. I may use for this purpose such a wrench as is shown in my prior application for U. S. Letters Patent, Serial No. 665442 filed December 13, 1911. In this event the said locking ring and the lock release ring will be provided at diametrically opposite points with spanner openings 58 and 59. It will be seen that the locking ring latch is released by the natural movement of the turning off the locking ring and without any additional appliance or attachment to the wrench. Furthermore, when the rings are turned in a direction to screw the locking ring on the inner hub member to lock the hub members together, the cam notches of the lock release ring are freed from the tooth 52 of the latch, so that the tooth 36 of said latch is free to enter the notches 33 of the locking ring and rides in and out of the same in the manner of an ordinary pawl and ratchet mechanism.

In Figs. 10, 11 and 12, I have shown a modification wherein the lock release means constitute, in addition to the ring member 65, (corresponding to the member 50 of the previously described construction) a second ring 66 arranged intermediate the inner or rear edge of the ring member 65 and the locking latch 67. The said locking latch 67 has a tooth 68 to engage the ratchet notches 33 of the locking ring 25, in the same manner as before described. The lock release ring 65 is provided at its rear margin with cam projections 69, like the projections 51 of the lock release ring 50. Instead of these cam projections directly engaging the locking latch or a part thereon, they are adapted to coöperate with other cam projections 71 on the ring 66. The ring 66 is mounted on the notched portion of the locking ring in a manner permitting it to move rearwardly thereon, but holding it non-rotative on the locking ring. As herein shown, this connection is effected by providing the ring 66 with transverse slots 72 which are engaged by pins or studs 73 which extend outwardly from the notched portion of the locking ring. The cam projections 69 of the lock release ring member 65 normally lie in the spaces between the cam projections 71 of the intermediate ring 66. The rear margin of said ring 66 is plain and engages a shoulder 75 on the locking latch. With this construction, when the lock release ring is angularly turned relatively to the locking ring, the cam projections 69 act on the projections 71 of the intermediate ring 66 to force said ring and the locking latch rearwardly to a sufficient extent to disengage the tooth 68 of the locking latch from the locking ring, and the said locking latch and ring 66 will be held in such position during the time that the locking ring is being turned off the inner hub member to separate said hub members. When the lock release ring is turned in the other direction relatively to the locking ring or in a direction to screw the locking ring onto the inner hub member, the said lock release member is angularly shifted relatively to the locking ring to reëngage the tooth of the latch with the locking ring, so that the said tooth clicks past the notches of the locking ring in the manner of an ordinary pawl and ratchet device. The construction shown in Figs. 10, 11 and 12 is, in other respects, the same as in the construction previously described.

The hub shown in Fig. 1 is adapted to be used as a rear wheel hub for a motor driven vehicle in which adaptation the inner hub member is extended to constitute a shell 62 to support a flange 63 by which to attach to the hub a standard brake drum, not shown. When adapted to the hub of a front or non-driving wheel, the shell 62 will, of course, be omitted.

It will be obvious that the structural details may be varied within the spirit and scope of the invention, and the invention is not limited to such details except as hereinafter made the subject of specific claims, or as imposed by the prior art.

I claim as my invention:—

1. A hub for demountable wheels comprising inner and outer non-rotatively fitted members, a locking ring screw-threaded to one of said members and bearing against the other member and provided on its rear edge with a series of rearwardly directed interspaced projections, a latch carried by said other member and having a locking tooth to engage said projections, and a lock release ring surrounding and having limited rotation on the locking ring and provided on its rear edge with rearwardly directed cam projections adapted, upon rotation of the release ring, to actuate the latch to release it from said locking ring.

2. A hub for a demountable wheel comprising inner and outer non-rotatively fitted members, a locking ring screw-threaded to one of said members and bearing against the other member and provided on its rear edge with a series of rearwardly directed interspaced projections, a lock release ring having limited rotation relatively to said locking ring and provided with a series of cam projections and a latch provided with a tooth to engage the locking ring projections to lock said ring in place, and provided with a second tooth adapted to coöperate with said release ring cam projections to release the latch from the locking ring.

3. A hub for a demountable wheel comprising inner and outer non-rotatively fitted members, a locking ring screw-threaded to one of said members and bearing against the other member and provided on its rear edge with a series of rearwardly directed interspaced projections, a latch carried by the other member and having a locking tooth to engage said projections, and a lock release ring surrounding and having limited rotation on the locking ring, and provided on its rear edge with cam projections which overlie the locking ring projections, said latch being provided on its end adjacent to said locking tooth with a release projection to coöperate with the cam projections of said release ring, for the purpose set forth.

4. In a hub for a demountable wheel, an inner and an outer hub member fitted one over the other and provided with interfitting parts adapted to be separated in demounting the hub, a locking ring screw-threaded to one of said members and engaging the other member to hold said interfitting parts together, and provided with a series of ratchet notches, a locking latch carried by said other member to engage said ratchet notches and a lock release ring surrounding and rotatively mounted on said locking ring, said rings having registering spanner openings to receive a wrench, and the spanner opening of the locking ring being longer than that of the release ring in the plane of their rotation, and means actuated by the lock release ring to release said latch from said locking ring.

5. In a hub for a demountable wheel, an inner and an outer hub member fitted one over the other and provided with interfitting parts adapted to be separated in demounting the hub, a locking ring screw-threaded to one of said members and engaging the other member to hold said interfitting parts together, said locking ring being provided on its rear end with ratchet notches, a spring pressed latch movable parallel to the axis of said hub and having a tooth to engage said notches, a lock release ring surrounding and mounted to rotate on said locking ring and provided at its rear end with cam projections and the latch being provided with a part to be acted upon by said cam projections, and means whereby said lock release ring has angular movement relatively to said locking ring.

6. In a hub for a demountable wheel, an inner and an outer hub member fitted one over the other and provided with interfitting parts adapted to be separated in demounting the hub, a locking ring screw-threaded to one of said members and engaging the other member to hold said interfitting parts together, said locking ring being provided on its rear end with ratchet notches, each having an abrupt wall and an oblique wall, a spring pressed latch movable parallel to the axis of said hub and having a locking tooth having an abrupt face, an oblique face to enter said notches, and a lock release ring mounted to rotate on the axis of said locking ring and provided at its rear end with V-shaped cam projections, the latch being provided with a tooth, the point of which is spaced from the point of the locking tooth a distance approximately equal to the width of said ratchet notches and formed with an oblique face to engage the oblique faces of said cam projections, the lock release ring having angular movement relatively to said locking ring.

7. In a hub for a demountable wheel, comprising separable hub members, a rotative screw-threaded ring for locking said members together, locking means for said ring, and a lock release member mounted on the ring and capable of limited relative rotation thereon with means actuated by the relative rotation of the release member to release the locking means, said locking ring and release member having registering spanner openings to receive the lug of a wrench, and the opening of the locking ring being longer than that of the release member, for the purpose set forth.

8. Locking means for locking together the separable members of a demountable hub comprising, in combination with two separable hub members, a locking ring to lock the said members, a latch having locking engagement therewith to lock the ring in place and movable in a plane parallel to the axis of the ring, a lock release member surrounding the locking ring and having angular movement relatively thereto, a series of rearwardly directed cam projections on said release member and a tapered tooth on said latch to engage said cam projections upon rotation of the release member relatively to the locking ring to thereby force the latch inwardly and to release the latch from the locking ring.

In testimony, that I claim the foregoing as my invention I affix my signature in the presence of two witnesses, this 9th day of September, A. D. 1912.

THOMAS I. DUFFY.

Witnesses:
G. E. DOWLE,
W. L. HALL.